United States Patent [19]
Smith et al.

[11] 3,886,841
[45] June 3, 1975

[54] ROCKET POWERED ROUND

[76] Inventors: Matthew S. Smith, 4400 Sarah Apt. 29, Burbank, Calif. 91505; Ernest A. Filippi, 18776 Kenya St., Northridge, Calif. 91324

[22] Filed: May 29, 1973

[21] Appl. No.: 364,658

[52] U.S. Cl. .................. 89/1 F; 89/1.818; 102/49.3
[51] Int. Cl. .......................................... F41f 3/04
[58] Field of Search ........ 102/49.1, 49.2, 49.3, 49.4, 102/49.5, 49.6, 49.7, 49.8; 89/1 F, 1.818

[56] References Cited
UNITED STATES PATENTS

| | | | |
|---|---|---|---|
| 1,347,125 | 7/1920 | Schneider | 102/49.7 X |
| 1,440,334 | 12/1922 | Braunger | 89/1 F X |
| 2,426,239 | 8/1947 | Renner | 102/49.7 X |
| 2,944,486 | 7/1960 | Jasse | 102/49.1 |
| 3,179,052 | 4/1965 | Jasse | 244/3.28 |
| 3,397,638 | 8/1968 | Gould | 102/49.7 |
| 3,500,715 | 3/1970 | Batsu | 102/49.3 |
| 3,610,091 | 10/1971 | Bornand | 102/49.1 |

FOREIGN PATENTS OR APPLICATIONS

| | | | |
|---|---|---|---|
| 662,429 | 12/1951 | United Kingdom | 102/49.1 |
| 278,821 | 5/1962 | Netherlands | 102/49.2 |
| 1,336,054 | 7/1963 | France | 89/1.818 |

Primary Examiner—Benjamin A. Borchelt
Assistant Examiner—H. J. Tudor
Attorney, Agent, or Firm—Don B. Finkelstein

[57] ABSTRACT

A rocket powered round for launching from a spike type launcher. The round has a war head coupled to a forward end of the rocket motor means. A tubular tail pipe is coupled to the aft end of the rocket motor and extends a predetermined distance therefrom. A launch cartridge means is detachably coupled with a predetermined force on the interior of the tubular tail pipe adjacent the aft end of the rocket motor means which has the nozzle portion thereof. The launch cartridge means is spaced a preselected distance from the rocket motor means to define an initial launch volume therebetween. The launch cartridge means has a launch charge contained therein. The launch charge is adapted to be ignited and generates pressurized launch gases in the initial launch volume which exert a second predetermined force between the launch cartridge means and the rocket motor means. The second predetermined force is greater than the first predetermined force so that the launch cartridge means is separated from the round. The launch cartridge means also has a probe means extending through the nozzle of the rocket motor means to reduce the area thereof and thereby reduce pressure buildup on the rocket motor during initiation of ignition thereof. The launch gases pass from the initial launch volume through the annular area between the probe and the nozzle and impinge upon the rocket propellant grain of the rocket motor to ignite the rocket propellant grain. The rocket propellant grain may comprise a boost portion for providing a boost thrust during combustion thereof and a sustainer portion for providing a sustainer thrust. The sustainer thrust is generally less than the boost thrust and extends over a longer period of time. The boost portion may be progressive radial burning and the sustainer portion may be end burning. The round is launched from a spike launcher having an elongated spike extending into the tubular tail pipe and abutting against the launch cartridge means. A firing pin in the spike launcher strikes a percussion primer in the launch cartridge means which ignites the launch charge means. The launch charge means deflagrates to provide the pressurized launch charge gases and detaches the launch cartridge means from the round. The launch forces exerted on the launch cartridge means are reacted by the elongated spike of the spike launcher and the round leaves the spike launcher. The launch cartridge means, being detached from the round remains adjacent the end of the spike of the launcher and falls in front thereof as the round is launched. Since the probe is attached to the launch cartridge means it is withdrawn from the nozzle as the round is launched and the full nozzle area is available for passing the propellant gases generated by the deflagration of the rocket propellant grain to provide thrust to the round during the flight thereof. Aero gyro stabilization means may be coupled to the tail pipe to provide aero gyro stability and drag shroud means may be detachably attached to the round to provide predetermined aerodynamic drag thereon during the flight thereof to achieve range zoning.

12 Claims, 3 Drawing Figures

PATENTED JUN 3 1975 3,886,841

ROCKET POWERED ROUND

REFERENCE TO RELATED APPLICATIONS

This invention is related to the invention described in copending patent application Ser. No. 307,444 filed Nov. 17, 1972 entitled WEAPON ARRANGEMENT and to cofiled, copending patent application Ser. No. 364,861 filed May 29, 1973 entitled IMPROVED ROCKET POWERED ROUND.

BACKGROUND OF THE INVENTION

1. Field of the Invention

This invention relates to the weapons art and more particularly to an improved rocket powered round launched from a spike type launcher.

2. Description of the Prior Art

The above-mentioned copending patent application Ser. No. 307,444 describes an invention in which a rocket boosted round is launched from a closed breach type launcher. The above-mentioned cofiled and copending patent application Ser. No. 364,861 describes a rocket powered round that is launched from a tubular type launcher. The present invention provides a rocket powered round that may be launched from a spike type launcher. In gereral, known prior art rocket boosted rounds have not been able to be rapidly fired from a launcher nor have they provided a high degree of accuracy on impact. That is, even though such rounds may be repetitively fired from substantially the same position the points of impact thereof would vary greatly. Further, range zoning to provide variations in the range of the rocket powered round for a given launch angle have generally not been achievable with such prior art rounds since structure was not provided for controlling the range of the round after launch.

Additionally, such prior art rocket powered rounds have generally not been conveniently fired from a spike type launcher but rather, have often required the utilization of a closed breach launcher in which a launch cartridge such as a blank cartridge or grenade launcher cartridge were utilized to launch the rocket powered round. Thus, the rounds were not completely self-sufficient for both launch power and rocket thrust power but required the ordnance and logistics to provide the closed breach launcher and the launch cartridge.

Thus, there has long been a need for an improved rocket powered was head round that is self-contained for both launch and powered flight energy, may be rapidly fired and provides a high degree of accuracy on the impact area.

SUMMARY OF THE INVENTION

Accordingly, it is an object of the present invention to provide an improved rocket powered war head round.

It is another object of the present invention to provide an improved rocket powered war head round for launch from a spike type launcher.

It is another object of the present invention to provide an improved rocket powered war head round having aero gyro stability during flight.

It is another object of the present invention to provide an improved rocket powered war head round for launch from a spike type launcher in which variations in range zoning may be quickly and easily achieved.

The above, and other objects of the present invention, are achieved, in a preferred embodiment, by providing a war head coupled to the forward end of a rocket motor. The rocket motor has a rocket propellant grain therein to provide the rocket power during the powered portion of the flight thereof. The rocket propellant grain may, if desired, have a boost portion for providing a boost thrust during the boost phase of flight and a sustainer portion for providing sustainer thrust, wherein the sustainer thrust is lower than the boost thrust, during the sustainer portion of the powered flight. The boost portion of the rocket propellant grain may be progressive, radial, burning and the sustainer portion of the rocket propellant grain may be end burning. The boost portion and sustainer portion may be fabricated from a single rocket propellant grain or, if desired, may be fabricated from two separate rocket propellant grains having the same or different compositions. The rocket motor means also incorporates a nozzle at the aft end thereof and the nozzle has a preselected nozzle area. A tail pipe is connected to the aft end of the rocket motor and extends a predetermined distance therefrom. A launch cartridge means is detachably mounted in the tubular passageway of the tail pipe and is adjacent the aft end of the rocket motor means and spaced a preselected distance therefrom to define an initial launch volume therebetween. The launch cartridge means is retained in this position with a first predetermined force. The launch cartridge means has a body member in which a launch charge means is contained. The launch charge means is adapted to deflagrate upon ignition thereof and the hot pressurized gases produced during the deflagration enter the initial launch volume and provide a second predetermined force greater than the first predetermined force between the launch cartridge means and the rocket motor means. This detaches the launch cartridge means from the rocket motor means. The launch cartridge means also has a probe means that extends through the nozzle to reduce the nozzle area thereof. Hot products of combustion from the deflagrating launch charge pass through the reduced area between the probe means and the nozzle walls to initiate ignition of the rocket propellant grain.

The rocket is launched by placing the tail pipe over a spike type launcher having an elongated spike. The elongated spike abuts against the aft end of the launch cartridge means and the spike type launcher has a firing pin therein that, when fired, strikes a percussion primer in the launch cartridge means which ignites the launch charge means. The force generated on the launch cartridge means is reacted by the spike launcher and the launch cartridge means is thus retained by the pressurized launch gases, as well as any hot products of combustion produced by burning of the rocket propellant grain, against the end of the spike launcher as the tail pipe slides thereover during launch. After the tail pipe has cleared the launcher the launch cartridge means falls away from the launcher in a manner similar to the way in which a spent cartridge case falls from an automatic rifle or pistol. Since the pressure reduction probe that extended into the nozzle is coupled to the launch cartridge means, after launch the full nozzle area is available for the pressurized gases generated by the combustion of the rocket propellant grain.

Aero gyro stabilization means which may take the form of a plurality of canted fins having a ring shroud thereon are provided to achieve aero gyro stabilization during flight.

In order to achieve range zoning one or more drag shroud means may be detachably coupled to the round, for example on the war head thereof and held in place by friction and aerodynamic forces acting thereon. The drag shrouds increase the drag of the round by a predetermined amount. Thus, for a given angle of fire, variations in the impact area in horizontal distance from the launcher may be achieved by the incorporation of one or more drag shroud means and thus provide range zoning.

BRIEF DESCRIPTION OF THE DRAWING

The above and other embodiments of the present invention may be more fully understood from the following detailed description taken together with the accompanying drawing wherein similar reference characters refer to similar elements and in which.

DESCRIPTION OF THE PREFERRED EMBODIMENTS

Figure 1:
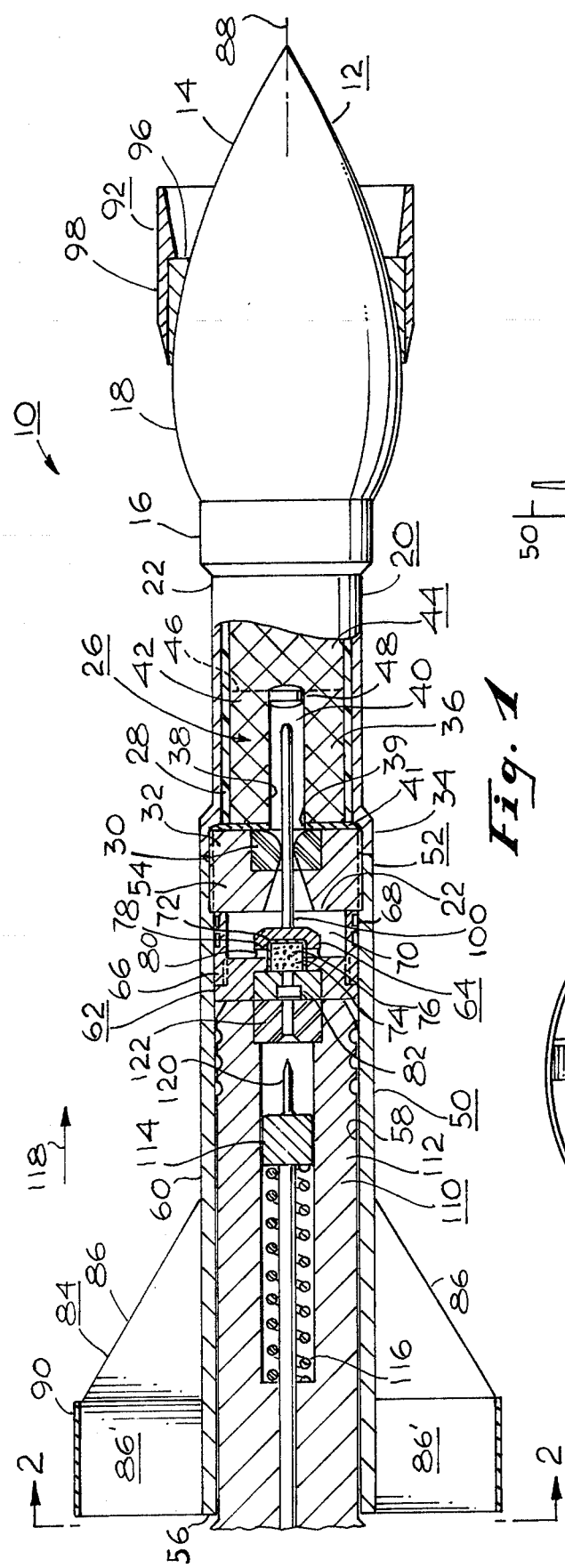
FIG. 1 is a sectional view of one embodiment of the present invention.

Referring now to the drawing there is shown in FIG. 1 a preferred embodiment of a rocket powered round, generally designated 10, according to the principals of the present invention. The rocket powered round comprises a war head 12 having a forward end 14, an aft end 16 and an external surface 18 therebetween defining a predetermined configuration.

A rocket motor means generally designated 20 has a forward end 22 coupled to the aft end 16 of the war head 14 and an aft end 22 spaced therefrom. The rocket motor means 20 comprises a rocket motor casing 24 having a rocket propellant grain 26 therein and separated therefrom by a linear means 28. A nozzle portion 30 of the rocket motor means 20 is adjacent the aft end 22 thereof and is held in place by a retainer 32 that threadingly engages the rocket motor casing 24 as illustrated at 34.

The rocket propellant grain 26 provides the desired thrust forces for powering the round 10 during the powered phase of flight thereof. The powered phase of flight thereof may, if desired, be comprised of a boost phase and a sustainer phase. In such an embodiment the rocket propellant grain 26 comprises a boost portion 36 having internal walls 38 defining a central aperture 40 therethrough. In the embodiment of the present invention shown in FIG. 1 the boost portion 36 of the rocket propellant grain 26 is a progressive, radial, burning grain that, when ignited, burns from the internal surface 38 to the external surface 42 thereof and is inhibited from burning on the external surface and on the end surface 39 by, for example, inhibitor disc 41. A sustainer portion 44 of the rocket propellant grain 26 is provided to generate the sustainer thrust during the sustainer phase of the powered flight of the round 10. The sustainer portion 44 is an end burning grain burning from the end indicated by the dashed line 46 towards the forward end 22 of the rocket motor 20. If desired the boost portion 36 and sustainer portion 44 may be fabricated from a single rocket propellant grain in which the aperture 40 may be drilled or otherwise provided or, alternatively, two separate rocket propellant grains may be utilized with a separation at the dashed line 46 to provide the boost portion 36 and sustainer portion 44. In such an embodiment the same or dissimilar compositions may be utilized for each of the boost portion 36 and sustainer portion 44 of the rocket propellant grain 26. An ignition pellet 48 may be positioned in the passage 40 to aid in ignition of the rocket propellant grain 26 as described below in greater detail.

A tail pipe means 50 has a forward end 52 coupled to the retainer means 32 of the rocket motor means 20 by, for example, a threading engagement thereto as indicated as 54. The tail pipe means 54 also has an aft end 56 spaced a preselected distance from the forward end 52 and internal walls 58 defining a tubular passageway extending from the forward end 52 to the aft end 56 thereof. The tail pipe means 50 also has external walls 60.

A launch cartridge means 62 is detachably mounted in the tubular passageway of the tail pipe 50 adjacent the forward end 52 thereof and the launch cartridge means 62 has a body member 64 spaced preselected distance from the aft end 22 of the rocket motor means 20. A sleeve means 66 which may threadingly engage the body member 64 is utilized to maintain the body member 64 spaced from the aft end 22 of the rocket motor 20. There may also be provided sealing means 68 to provide a gas pressure type seal between the sleeve means 66 and the internal walls 58 of the tail pipe 50 to prevent the passage of pressurized gases therebetween. The sealing means 68 may, for example, take the form of an O-ring seal, a labyrinth seal, or the like. The preselected spacing of the body member 64 of the launch cartridge means 62 from the aft end 22 of the rocket motor means 20 provides an initial launch volume 70 therebetween. The body member 64 has first walls 72 defining a launch charge cavity 74 therein and a launch charge means 76 is positioned in the launch charge cavity 74. The body member 64 also has second walls 78 defining gas passageways 80 providing communication between the launch charge volume 74 and the initial launch volume 70.

A percussion primer 82 is coupled to the body member 64 and is in ignition inducing relationship to the launch charge means 76 positioned in the launch charge cavity 74.

In order to provide greater stability during flight and thus greater accuracy on impact, preferred embodiments of the present invention incorporate aero gyro stabilization means 84. The aero gyro stabilization means may comprise a plurality of canted fin means 86 having a canted portion 86' that are not aligned with the longitudinal axis 88 of the round 10 and a ring shroud 90 coupled thereto. The angle of cant may be selected, for example, to be between 5° and 20° as required for effective spin rates. During flight the rocket is forced to spin by the canted fins and, as utilized herein, aero gyro stability is defined to mean the condition when the center of pressure is aft of the center of gravity and there is a spin rate of the rocket boosted war head round 10 that is at least one order of magnitude larger than the yawing frequency of the rocket powered war head round 10 for the rocket powered round 10 in the non-spin condition.

Since the range of the rocket powered round 10 depends upon the drag characteristics thereof for a given thrust characteristic of the rocket propellant grain 26 and angle of launch, in the preferred embodiments of the present invention a detachably mounted drag shroud means 92 is provided. The drag shroud means 92 comprises a first portion 96 and a second portion 98. One or both of the first portions 96 and 98 may be utilized as desired to provide predetermined drag characteristics. The first portion 96 is detachably mounted on the external surface 18 of the war head 12 and retained thereon by friction and the aerodynamic drag forces acting thereon. The second portion 98 of the drag shroud 92 may also be detachably mounted on the first portion 96 and retained thereon by friction and the aerodynamic forces acting thereon. Both of the portion 96 and 98 increase the drag of the round. Thus, the drag shroud means 92, as illustrated, may provide three range zones of firing for a given angle of launch. The minimum range is achieved with maximum drag and thus both the first portion 96 and second portion 98 of the drag shroud 92 may be installed. An intermediate range is achieved by omitting the second portion 98 and only applying the first portion 96 of the drag shroud 92. The maximum range for the round configuration 10 shown in FIG. 1 is achieved by omitting both the first portion 96 and second portion 98 and thus minimizing the drag. Appropriate tables may be computed for a given round configuration so that for a given angle of launch the range to be achieved with the omission of the drag shroud 92 entirely, with only the first portion 96 or both the first and second portions 96 and 98 of the drag shroud 92 added to the round 10 may be determined.

The sleeve means 66 utilized to space the body member 72 of the launch cartridge means 62 from the aft end 22 of the rocket motor means 20 may be fabricated in different lengths in order to increase or decrease the initial launch volume 70 and thus provide variations in launch force. The above-mentioned firing tables may also include, in such an embodiment, tables for various axial length sleeve means 66.

It has been found that, in some embodiments of the present invention, overpressurization of the rocket propellant grain 26 during launch thereof may cause fracture or rupture of the grain. In order to minimize the occurrence of such fracturing or rupturing of the rocket propellant grain 26 there is provided, in preferred embodiments of the present invention, a pressure probe 100 coupled to the body member 64 of the launch cartridge means 62. The probe means 100 has a preselected area and extends through the nozzle means 30 of the rocket motor means 20 and thus reduces the preselected area of the nozzle by an amount equivalent to the area of the probe 100. The size of the probe area may be selected as required for different embodiments of the present invention to prevent excess pressure on the rocket propellant grain 26.

When it is desired to launch the round 10 it may be placed on a spike type launcher generally designated 110 having an elongated spike portion 112 that slidingly fits into the tubular tail pipe 50 and abuts against the body member 64 of the launch cartridge means 62. The spike type launcher 110 has a firing pin 114 contained therein and biased towards the launch cartridge means 62 by a spring means 116. In the embodiment shown in FIG. 1 the firing pin 114 is in the retracted position. Trigger mechanism (not shown) of conventional design may be incorporated to hold the firing pin 114 in the retracted position shown in FIG. 1 until it is desired to launch the round 10. When the trigger is released the firing pin moves forwardly in the direction indicated by the arrow 118 and the prong 120 of the firing pin 114 passes through an alignment block 122 of the spike type launcher 110 and impacts on the percussion primer 82 which is thus fired. The hot products of combustion from the precussion primer 82 impinge against the launch charge means 76 contained within the launch charge cavity 74 of the body member 64 of the launch cartridge means 62 to provide ignition thereof. Upon ignition of the launch charge means 76 hot gaseous pressurized products of combustion pass through the passageways 80 and into the initial launch volume 70. In the initial launch volume 70 they exert a force between the launch cartridge means 62 and the aft end 22 of the rocket motor means 20 to provide a second force which is greater than the first force utilized to retain the launch cartridge means 62 adjacent the rocket motor means 20. For example, the first force may be provided by an adhesive bonding of the sleeve means 66 to the aft end 22 of the rocket motor means 20, by crimping of the body member 64 in the tail pipe 50 against the internal walls 58 thereof, or by any other desired means. In any event, the forces utilized to retain the launch cartridge means 62 are less than those produced by the pressurized launch gases in the initial launch volume 70 and thus the launch cartridge means 62 is detached from the round 10. A portion of the hot pressurized launch gases passes past the pressure probe 100 and through the nozzle 30 to impinge against the internal surface 38 of the boost portion 36 of the rocket propellant grain 26 as well as against the ignition pellet 48 which may be positioned therein. These hot products of combustion impinging thereon initiate the ignition of the rocket propellant grain 26 and hot products of combustion therefrom flow through the nozzle 30 in a direction opposite to the direction indicated by the arrow 118. For the time period while the round 10 is on the launcher 110 the gases produced by combustion of the rocket propellant grain 26 enter into the launch volume between the launch charge means 62 and the aft end 22 of the rocket motor means 20. The force on the launch cartridge means 62 is reacted by the elongated spike 112 abutting theragainst. The launch forces move the round 10 in the direction indicated by the arrow 118. The tail pipe 50 slides along the elongated spike 112 and past the launch cartridge means 62. During the launch the nozzle 30 moves away from the pressure probe 100 to leave the full preselected nozzle area available for the thrust producing gases from the rocket propellant grain 26. When the tail pipe 50 has cleared the launcher 110 and the launch cartridge means 62, the launch cartridge means 62 falls away from the spike launcher 110 in a manner similar to a spent cartridge case from an automatic rifle or pistol.

The sealing of the launch cartridge means 62 in the tail pipe 52 provides a sealed unit that is free of environmental effects or deterioration.

As noted above, preferred embodiments of the present invention incorporate a rocket propellant grain 26 having both a boost portion 36 and a sustainer portion 44. It has been found desirable to provide a sustainer portion to the rocket propellant grain and such a sustainer portion provides thrust during the sustained phase of flight of the round 10 that tends to make cross wind drift go to zero and, also, maintains the velocity at an acceptable level for optimum stability at the peak of the trajectory during high angle fire. For the condition of an aero gyro stabilized round 10 entering a cross wind, it will have an induced yaw angle to the relative wind and, as the round enters the cross wind the forward portion 14 of the war head 12 turns to line up with the relative wind vector. As long as the round 10 is in the cross wind, the war head will precess and nutate about the relative wind vector. If no sustainer portion 44 is provided the round drifts in the direction of the cross wind. However, with the sustainer thrust, the thrust vector balances the drag vector and the round maintains the correct desired heading at the desired velocity.

For high angles of launch, for example on the order of 60° to 80°, gravity and drag forces cause a non-sustained round to lose a comparatively large amount of velocity by the time it reaches the peak of the trajectory. When the rounds lose too much velocity, stability becomes marginal and the rounds tend to drift from the desired trajectory with a comparatively large dispersion vector. However, when sustainer thrust is provided by a sustainer portion 44 of the rocket propellant grain 26 the velocity will stay at an acceptable level for optimum aero gyro stability and the rounds maintain proper trajectory and accuracy. For example, at a high angle of fire of approximately 75° the velocity at the peak of the trajectory is only on the order of fifteen per cent of the maximum velocity attained at the burnout of the boost portion 36. However, with a sustainer portion 44 the velocity at the peak of the trajectory will be approximately forty per cent of the maximum velocity which is sufficient for good aero gyro stability. Since stability is a function of velocity squared, the boost sustained round, as above described, has approximately seven times the stability of a round in which only a boost rocket is used when at the top of its trajectory, and thus the dispersion vector will tend towards zero. The level of the thrust provided by the sustainer portion 44 of the rocket propellant grain 26 is selected to be approximately equal to the drag of the round 10 at the burnout of the boost portion 36. It will be appreciated that the selection of the value of the thrust level for the boost portion 44 may be made for the round 10 without the drag shroud 92, with the first portion 96 thereof installed or with both the first portion 96 and second portion 98 thereof installed. Alternatively, of course, the level of the sustainer thrust may be selected at some value providing close approximation of the drag of the round 10 in all three configurations.

Figure 3:
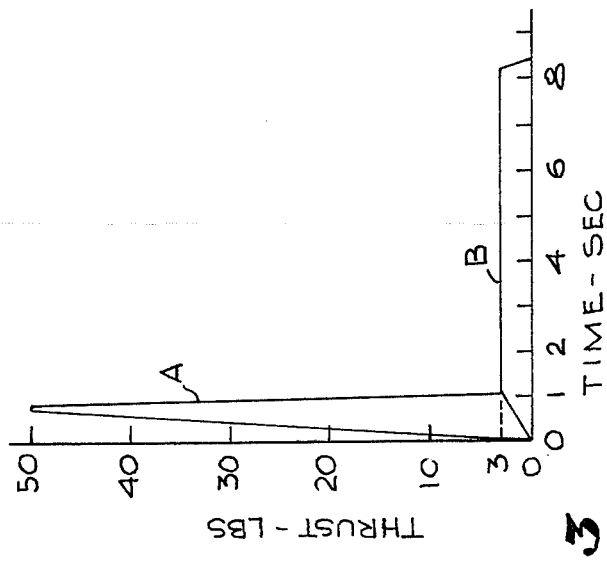
FIG. 3 is a graphical representation of the thrust-time characteristics of an embodiment of the invention.
Figure 2:
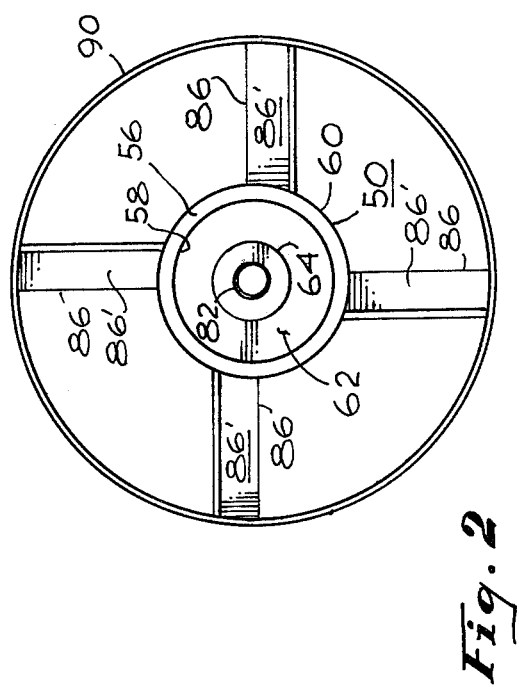
FIG. 2 is a view along the line 2—2 of FIG. 1.

FIG. 3 illustrates the thrust time characteristics of the rocket propellant grain 26 when utilized in a round of approximately 50 millimeters in war head 12 diameter, having a total weight of 2.0 pounds. As can be seen on FIG. 3, thrust from the boost portion 36, indicated by curve A on FIG. 3, rapidly builds up to a value of 50 pounds and drops to zero at burnout thereof after 1 second. The sustainer portion 44 builds up to a level of 3 pounds of thrust and continues for approximately 8 seconds during the sustainer phase of the flight of the round 10. It will be appreciated that other thrust-time characteristics of the rocket propellant grain 26 may be selected as desired.

From the above it can be seen that there has been provided an improved rocket powered round that may be launched from a spike type launcher. The rocket powered round may have both a boost portion of rocket thrust and a sustainer portion of rocket thrust during the rocket powered portion of the flight thereof. A high degree of stability is provided by incorporating aero gyro stabilization means on the round and variations in range zoning may be provided by the incorporation of drag shroud means detachably mountable on the round. The round is provided with an integrally mounted launch cartridge to minimize logistics and ordnance considerations in effective field utilization of the round.

Those skilled in the art may find many variations and adaptations of the present invention and the appended claims are intended to cover all such variations and adaptations falling within the true scope and spirit thereof.

We claim:

1. A rocket powered round of the type having a launch phase and a powered phase of flight and for launching from a spike launcher of the type having an elongated spike for insertion into the round for support thereof during launch, and comprising, in combination:

a war head having a forward end, an aft end and an external surface having a predetermined configuration;

a rocket motor means having:
 a forward end coupled to said aft end of said war head;
 an aft end spaced from said forward end;
 a rocket propellant grain positioned within said rocket motor means intermediate said aft end and said forward end thereof; and
 a nozzle portion having a preselected nozzle area and coupled to said aft end and communicating with said rocket propellant grain;

a tail pipe having a forward end coupled to said aft end of said rocket motor means and an aft end spaced a first preselected distance from said forward end thereof, external walls, and internal walls defining a tubular passageway extending from said forward end to said aft end of said tail pipe;

a launch cartridge means detachably mounted in said tubular passageway of said tail pipe adjacent said forward end thereof and restrained therein by first predetermined force, and said launch cartridge means having:
 a body member in spaced relationship to said aft end of said rocket motor means to define an initial launch volume therebetween:
 a launch cartridge means in said body member for generating pressurized launch gases in said initial launch volume for the condition of ignition thereof for launching the round and initiating ignition of said rocket propellant grain, and said pressurized launch gases exerting a second predetermined force between said launch cartridge means and said rocket motor means greater than said first predetermined force to detach said launch cartridge,
 whereby said elongated spike of said spike launcher is inserted into said tubular passageway of said tail pipe for abuttment against said launch cartridge means, and said launch cartridge means falls from said aft end of said tubular passageway of said tail pipe for the condition of the round launched from the spike launcher.

2. The arrangement defined in claim 1 and further comprising:

aero gyro stabilization means coupled to said tail pipe in regions adjacent said aft end thereof to provide aero gyro stability thereto.

3. The arrangement defined in claim 2 wherein said aero gyro stabilization means comprises:
   a plurality of canted fins; and
   a ring shroud coupled to said plurality of canted fins.

4. The arrangement defined in claim 1 and further comprising:
   drag shroud means mountable on said external surface of said war head for providing predetermined drag forces.

5. The arrangement defined in claim 1 wherein said launch cartridge means further comprises:
   a sleeve means coupled to said body member and extending between said body member and said aft end of said rocket motor means for positioning said body member in said spaced relationship to said aft end of said rocket motor means;
   sealing means for providing a substantially gas tight seal between said sleeve means and said internal walls of said tail pipe;
   said body member further comprises:
     first walls defining a launch charge cavity, and said launch charge position therein;
     second walls defining gas passageway means between said launch charge cavity and said initial launch volume; and
     said initial launch volume communicates with said nozzle portion of said rocket motor means to allow transfer of said pressurized launch gases through said nozzle means to initiate ignition of said rocket propellant grain.

6. The arrangement defined in claim 5 wherein said launch cartridge means further comprises:
   probe means having a preselected probe area less than said preselected nozzle area, and said probe means coupled to said body member and extending through said initial launch volume and into said preselected nozzle area of said nozzle means for reducing the gas passage transfer area through said nozzle means; and
   ignition means coupled to said body member for igniting said launch cartridge means.

7. The arrangement defined in claim 1 wherein said powered flight phase comprises a boost phase and a sustainer phase, and said rocket propellant grain further comprises:
   a boost portion for generating a boost thrust; and
   a sustainer portion for generating a sustainer thrust.

8. The arrangement defined in claim 7 wherein:
   said boost thrust is greater than said sustainer thrust, said boost portion of said rocket propellant grain is radial burning, and said sustainer portion of said rocket propellant grain is end burning.

9. The arrangement defined in claim 8 wherein said launch cartridge means further comprises:
   a sleeve means coupled to said body member and extending between said body member and said aft end of said rocket motor means for positioning said body member in said spaced relationship to said aft end of said rocket motor means;
   sealing means for providing a substantially gas tight seal between said sleeve means and said internal walls of said tail pipe;
   said body member further comprises:
     first walls defining a launch charge cavity, and said launch charge position therein;
     second walls defining gas passageway means between said launch charge cavity and said initial launch volume; and
     said initial launch volume communicates with said nozzle portion of said rocket motor means to allow transfer of said pressurized launch gases through said nozzle means to initiate ignition of said rocket propellant grain.

10. The arrangement defined in claim 9 wherein said launch cartridge means further comprises:
    probe means having a preselected probe area less than said preselected nozzle area, and said probe means coupled to said body member and extending through said initial launch volume and into said preselected nozzle area of said nozzle means for reducing the gas passage transfer area through said nozzle means; and
    ignition means coupled to said body member of igniting said launch cartridge means.

11. The arrangement defined in claim 10 and further comprising:
    aero gyro stabilization means coupled to said tail pipe in regions adjacent said aft end thereof to provide aero gyro stability, and said aero gyro stabilization means comprising:
      a plurality of canted fins; and
      a ring shroud coupled to said plurality of canted fins.

12. The arrangement defined in claim 11 and further comprising:
    drag shroud means detachably mountable on said external surface of said war head for providing predetermined drag forces.

* * * * *